Feb. 1, 1966   T. T. CAPARRELLA ETAL   3,232,426
ORE CONCENTRATION APPARATUS
Filed July 13, 1962   2 Sheets-Sheet 2
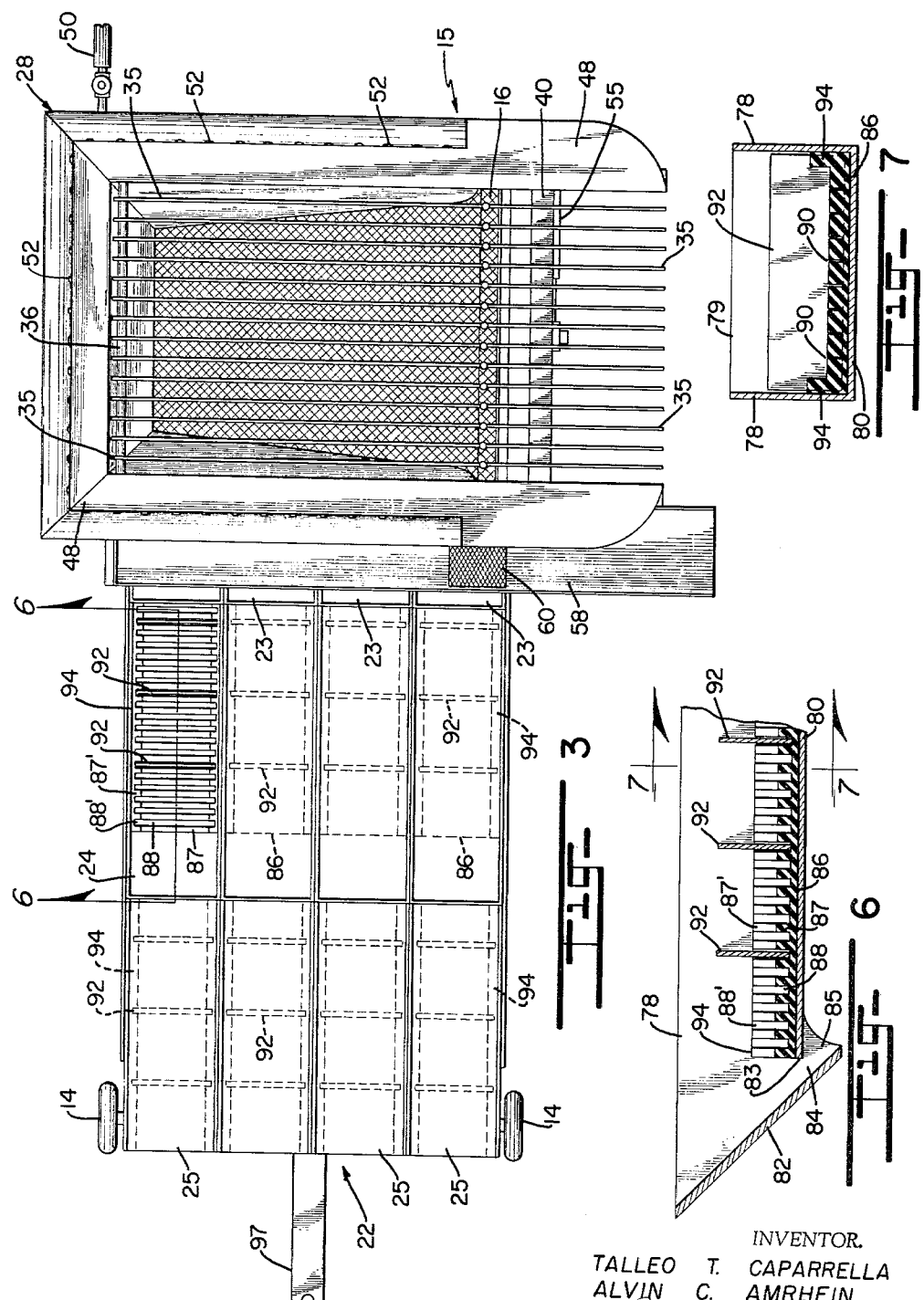
INVENTOR.
TALLEO T. CAPARRELLA
ALVIN C. AMRHEIN
BY
ATTORNEY

United States Patent Office 3,232,426
Patented Feb. 1, 1966

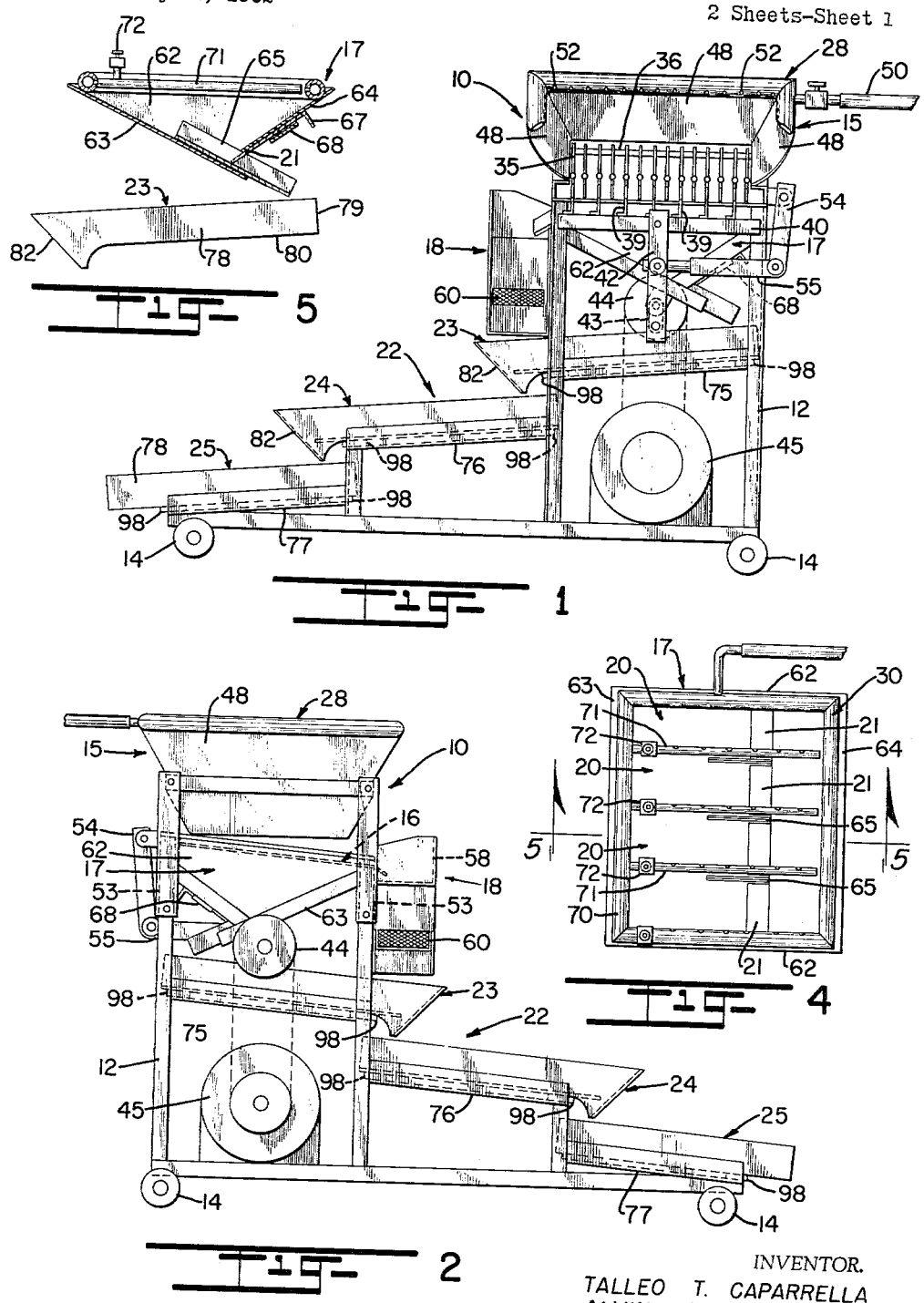

3,232,426
ORE CONCENTRATION APPARATUS
Talleo T. Caparrella, 1800 Ford St., Golden, Colo., and Alvin C. Amrhein, 3441 W. Colfax, Denver 4, Colo.
Filed July 13, 1962, Ser. No. 209,656
10 Claims. (Cl. 209—44)

This invention relates to a new and improved apparatus for the separation and recovery of fine, heavy ores; and, more particularly relates to a highly efficient means for separating and removing gold in high concentrations from sand, gravel and rock materials containing the same.

It is a principal and foremost objective of the present invention to substantially increase the efficiency of ore separation apparatus, especially as it pertains to the recovery of gold and other valuable substances from sand and gravel materials in a simple and dependable manner.

It is a further object of the present invention to provide for a separation apparatus which is extremely compact, easily transportable and is capable of bringing about high percentage recovery of valuable substances, such as, gold from sand and gravel material; more specifically, wherein the apparatus is capable of carrying out the combined agitation, washing and sluicing of the material for separation of fine heavy substances therefrom in a highly efficient manner.

It is a further object to provide in an apparatus for concentrating ores a new and improved construction for arrangement for dividing out and collecting the ore according to its specific gravity and size in a continuous highly efficient manner.

It is a still further object to provide for a placer mining apparatus for separation of gold from sand and gravel containing the same, which apparatus incorporates a minimum number of parts in performing the combined agitation, washing, and separation of the gold in highly concentrated form, so as to permit the gold to be separately and continuously collected while washing off the undesired sand and gravel material.

The above and other objects, advantages, and features of the present invention will become more readily understood and appreciated from a consideration of the following detailed description taken together with the accompanying drawings, in which:

FIGURE 1 is a side elevational view of a preferred form of ore concentrating apparatus specifically adapted for use in gold placering.

FIGURE 2 is a side elevational view of the opposite side of the apparatus shown in FIGURE 1.

FIGURE 3 is a plan view of the preferred form of apparatus.

FIGURE 4 is a plan view of the hopper section forming a part of the concentrating apparatus.

FIGURE 5 is a sectional view taken on line 5—5 of FIGURE 4.

FIGURE 6 is a fragmentary view in section of a preferred form of sluice box employed taken on line 6—6 of FIGURE 3; and FIGURE 7 is a sectional view taken on line 7—7 of FIGURE 6.

Referring in more detail to the drawings there is shown by way of illustrative example a preferred form of apparatus 10 which is particularly adapted for placering gold and other fine, heavy ore substances from loose sand, gravel, and rock materials containing the same. Broadly, in accordance with the present invention, the preferred form of apparatus comprises a frame 12 which is mounted on wheels 14 for easy portability. One end of the frame carries a top grizzly or agitator generally designated at 15 for separating large rocks and allowing material of a selected size to drop therethrough to a shaker screen 16. The shaker screen is of a specified size and easily replaceable to selectively pass fined material into a hopper 17. A chute 18 catches the waste material from the screen, the shaker screen being inclined toward the chute so that upon agitation the coarser materials will move off the screen and drop directly into the chute 18. The hopper 17 is of downwardly convergent configuration having a series of bins 20 with gated openings 21 which may be independently opened and closed to selectively pass the material into a series of rows of inclined sluices 22, each of which is located beneath a respective opening. Each row of sluices 22 is arranged in stepped intervals and includes an upper box 23, intermediate box 24 and lower box 25.

To wash the material into the hopper area an upper water spray 28 is positioned in surrounding relation to the grizzly 15, and a lower water spray 30 is mounted in the wall of the hopper 17 for impingement on the finer material passing into the hopper so as to wash it into the sluices 22. The sluices will then permit gravity flow of the material therealong and, in a manner to be described, will collect the fine heavy material on the floor surface of the boxes while permitting the fine, lighter material to pass with the water stream off the end of the lower course of sluices 25 for separate collection.

Now considering in more detail the individual stages and features of the apparatus, the grizzly 15 includes an inclined grating comprised of spaced heavy steel bars 35 running the length of the grating. Preferably, the bars are mounted at their upper ends on a shaft 36; at their opposite, lower ends means in the form of spaced angle irons 39 are mounted on a floating support plate 40 which is reciprocated up and down by linkage 42 including a crank arm 43 secured to a driven pulley 44 operated off power source 45. The members 39 are spaced to engage the undersides of alternate bars 35 whereby the alternate bars are given a reciprocating up and down action to agitate the material and to cause the larger rock materials, of a size greater than the width between the bars, to gradually move off the lower end of the grating. The finer material will of course pass through the bars onto the shaker screen 16. Surrounding the inclined grating on three sides is an upstanding wall portion 48 and the water spray 28 preferably includes a pipe positioned around the top edge of the wall and connected into a water supply through main pipe 50. This pipe 28 has a series of preforations 52, which are directed inwardly and downwardly so as to be concentrated on the grating area and to encourage the finer material to pass between the heavy bars 35 to the shaker screen.

The shaker screen 16 is made to be easily replaceable and to have a mesh of a specified size in order to selectively pass the finer sand and gravel materials therethrough. Accordingly, the shaker screen is generally rectangular in shape and is mounted in longitudinal slotted portions 53 on the inner surfaces of opposite sides of the frame 12 so as to incline forwardly and downwardly essentially at right angles to the inclination of the grizzly 15. One side of the shaker screen is drivingly connected through arm 54 and cylinder 55 to the linkage arm 42 so that the horizontal reciprocation motion of the arm 42 is translated to the shaker screen. In this way, the screen is powered to sift the finer material into the hopper section 17, with the coarser material being shaken off the screen into the waste chute 18. The waste chute is positioned at the upper, front end of the frame and includes a trough 58 inclining downwardly and projecting beyond the side to dump the waste material away from the apparatus. At the lower end of the chute 58 a screen 60 is provided to permit any gold or fine material that may have dropped into the trough 58 to pass into an upper sluice box 23; also, water flowing with the material into the chute will pass through the screen 60 to the sluice box 23. Accordingly, in the initial stage of operation, the coarser material is effectively separated by combined agitating and shaking, while being thoroughly washed by the water spray 28. This will insure that any gold loosely bound to the coarser material will be effectively separated therefrom and pass along with the finer material into the hopper section 17 or the sluice box 23.

As best seen from FIGURES 3–5, the hopper section 17 is formed of vertical end walls 62 and downwardly convergent sidewalls 63 and 64. Vertical dividers 65 serve to partition the hopper into the separate bins 20, and in each the opening 21 is formed in the rear wall 64, over which there is positioned an adjustable gate 67. Each gate rides in runners or grooves 68 in the vertical divider and can be manually adjusted up and down to control the size of the opening 21 therethrough; or, to individually close off separate bins when desired. A header pipe 70 extends horizontally around the upper periphery of the entire hopper section with auxiliary spray lines 71 and shut-off valves 72 extending over each bin to spray the finer material collected therein. In this way, the operator can turn off the water at one or more bins as desired without affecting the movement of the material through the other bins.

In order to support the sluices 22 in desired relation, the lower portion of the frame is made up of three inclined platforms 75, 76 and 77 arranged in stepped relation, each platform supporting a series of sluices in horizontal, but slightly inclined relation. The upper sluices 23 are supported on the platform 75, the rearward closed end of each box being located directly beneath one of the gated openings 21; and the lower course of sluices are similarly positioned on platforms 76 and 77 so that their rearward ends are positioned directly beneath the front ends of the next upper course of sluices in succession.

An important feature of the present invention resides in the particular construction and arrangement of each sluice as shown in detail in FIGURES 6 and 7. Each box is generally in the form of an oblong trough having sides 78, end wall 79, and bottom panel 80; however, the front wall of each box has an end panel 82 which is inclined rearwardly and downwardly in spaced relation to the forward terminal end 83 of the bottom panel 80 so as to provide a limited opening or recess 84 therebetween. The end panel 82 forms with downward extensions 85 of the side wall a rearwardly directed drop area so as to force the material, as it moves past the forward end of the bottom panel 80, to reverse its direction of movement for passage downwardly and rearwardly into the next lower sluice. It has been found that this reversal in movement will encourage gravity separation of the materials, so that the fine and heavy, more valuable substances to be collected will tend to drop ahead of the lighter material onto the bottom surface of the next successive box. To entrap the fine, heavy substances, each bottom panel 80 is lined with ribbed matting 86 preferably composed of a rubber or rubber-like material. The matting is provided with closely spaced, upstanding riffles in the form of shallow ribs 87 extending laterally across the trough with alternate grooves 88 being formed between the ribs. In addition, to lend additional flexibility to the ribs, they are formed with vertical serrations or siping 90 at spaced intervals throughout their length. Moreover, a series of dividers or riffles 92 are spaced at intervals along the length of each box, each divider being of a thickness to be inserted in close-fitting relation in a groove 88. The dividers 92 stand relatively high in relation to the ribs 87; and, to help support the dividers additional rubber matting 94 is secured along the inner surfaces of the sides 78 with alternate ribs 87' and grooves 88' aligned with the ribs 87 and grooves 88, respectively.

The spacing between ribs 87 may vary, along with that between dividers 92, in accordance with the size and characteristics of ore to be recovered. In general, the spacing will vary directly with the size of material. For instance, the spacing used for gold recovery may be on the order of ¼" to ½", but would be decreased for finer materials. Also, the spacing between dividers would be more on the order of 7" to 12". In composition, the dividers 92 are most desirably formed of an aluminum material and will serve to retard the flow of any heavier materials not entrapped in the matting 86 so as to encourage their separation from the main stream.

The combined action of the riffled portions with the successive reversal in movement of the material as it is caused to advance through the sluices has been found to produce highly efficient removal of the valuable substances, in the range of 80–95% efficiency. Due to the high specific gravity of gold, for example, by causing it to drop separately from the forward end of each sluice to the next slice, followed by a second reversal in flow as it runs into each next lower sluice, it will tend to collect in the grooved areas between the ribs 87. Without sudden reversal in flow, the heavier material will tend to remain in the stream with little opportunity to become separated. This would be true even where the sluices are arranged at different levels and the material is allowed to pass freely from one level to the next. Furthermore, in the present invention, notwithstanding a double reversal in flow between each level and the retarding action of the riffles, the heavier specific gravity materials are effectively separated without interrupting the continuity of the operation in any way.

An added feature of the present invention resides in the particular disposition and arrangement of the sluices in relation to the hopper section. By making the boxes 22 individually removable, together with the use of separate divided openings 21 corresponding with each row of boxes, it is possible to close an individual opening 21, then to remove and clean each associated row of boxes without interrupting the flow of material through the other hopper bins and sluice boxes. The material will merely collect in the closed bin until the corresponding row of boxes have been replaced.

In operation, the apparatus is transported to the mining site and for this purpose a trailer hitch 97 is provided. The water sprays 28 and 70 are connected to a pumping unit, not shown, and the power source 45 is also set in operation. Typical materials or ores to be worked would include gold, zinc, silver, lead and copper. In the undivided state, this material is fed into the agitator 15 where the larger gravel and rocks are removed, the remaining material passing through the agitator to the screening section 16. According to the ore to be recovered various mesh sizes can be used in order to divide the finer material including the ore. The coarse sand and gravel will of course pass into the waste chute 18. In the hopper section 17, the openings 21 are regulated to insure complete washing of the material before continued movement into the sluices. Also, the opening size is regulated in relation to the capacity of water flow so that the material will wash through the sluices with the water level being held at about ⅔ the depth of the boxes. Under reverse flow at periodic intervals the fine heavy substances will tend to collect separately along the bottom as the lighter materials are carried by the water through the sluice area. In this connection, the height of the dividers is regulated to selectively retard passage of the heavier materials with the water. To further encourage separation of the materials, the sluices will be under limited vibration as a result of the flexible mounting of the entire frame on the wheels or tires 14, the vibratory motion being developed by the power source 45. For many materials, such as clay, where the ore is more difficult to separate, vibration may be increased by the use of special flexible rubber or spring mountings 98 interpositioned between the corners of the sluice boxes and the frame.

From the foregoing, it will be recognized that the elements comprising the present invention cooperate together in a greatly improved manner to bring about efficient recovery and concentration of valuable substances. In this relation, the particular arrangement and construction of the sluice boxes is believed to be of particular significance in the manner in which they govern the flow characteristics of material passing therethrough. Additionally, it will be evident that the sluice boxes would have utility in apparatus other than the particular form of apparatus shown and this would also apply to the particular construction and arrangement of the initial agitation and screening stage, as well as the hopper section 17. As pointed out, the machine is made to be portable, relatively lightweight and very compact. The various steps comprising the method of the present invention have been made apparent from the foregoing description, and briefly would consist of first agitating the material on an inclined grating to remove the coarser gravel and rock material therefrom, screening the remaining material to separate out the finer substances and material, washing the fine material through the hopper section and along a series of downwardly inclined troughs or sluices having irregular bottom surfaces, and reversing the direction of flow of material between each sluice level thereby to encourage separate movement and collection of the fine heavy substances along the bottom of the sluice.

Accordingly, it is to be understood that various modifications and changes may be made in the preferred form of apparatus as set forth without departing from the scope of the present invention as defined by the appended claims.

What is claimed is:

1. In ore concentrating apparatus for the wet separation of materials according to specific gravity, a frame, separating means carried on the frame for preliminary separation of materials containing the ore, said separating means including liquid delivery means for washing the finer materials through said separating means, and a series of sluices arranged in downwardly and forwardly stepped relation away from said separating means, each sluice having a forwardly inclined, riffled floor and a front reverse delivery opening being rearwardly directed in relation to each next sluice in succession whereupon the direction of movement of materials along said sluices is reversed through each delivery opening and reversed again for forward movement along each sluice to encourage gravity separation of the heavier ore substances from the materials.

2. In an ore concentrating apparatus according to claim 1, said riffled floor for each sluice being defined by a lining having upstanding, flexible ribs extending transverse to the length of each sluice.

3. In an ore concentrating apparatus according to claim 1, said riffled floor for each sluice being defined by a rubber mat having transverse shallow ribs arranged in closely spaced relation along the length of each sluice.

4. In an ore concentrating apparatus according to claim 3, said riffled floor being further characterized by dividers positioned at widely spaced intervals in relation to the spacing between said ribs, and said dividers being substantially greater in height than said ribs.

5. In an ore concentrating apparatus according to claim 4, each sluice having closely spaced ribs extending along the inner surfaces of opposite sides thereof in aligned relation with said transverse shallow ribs.

6. In an ore concentrating apparatus according to claim 1, wherein vibration mounting elements are interposed between said frame and each of said sluices, and drive means on said frame to vibrate said sluices in relation to said frame whereby to encourage separation of material passing therethrough.

7. A gold ore placer mining apparatus comprising a frame, first separating means carried on the frame including an inclined grate with means to reciprocate the grate to move larger materials off the grate while encouraging the finer materials to pass therethrough, second separating means including an inclined shaker screen beneath said first separating means, said screen being adapted to pass materials of selected size therethrough, a hopper for receiving and collecting the screened materials including a series of lower gated openings with means to independently open and close the openings for passage of material therethrough, liquid delivery means in said hopper for washing the material downwardly through the openings, and a series of removable sluices beneath each gated opening, each series of sluices being arranged in downward stepped relation away from said hopper, and each sluice having an inclined riffled floor portion and a front delivery opening being rearwardly directed in relation to the forward inclination of each floor for reverse delivery of the material therethrough to the next sluice in succession whereby to encourage gravity separation of the remaining material for collection of the gold ore along said riffled floor portion.

8. An ore concentrating apparatus comprising a frame, first separating means carried on the frame including an inclined grate with reciprocating means to reciprocate the grate to move larger materials off the grate while encouraging the finer materials to pass therethrough, second separating means including an inclined shaker screen beneath said first separating means, said screen being adapted to pass materials of a selective size therethrough, a hopper for receiving and collecting the screened materials including a row of lower gated openings with means to independently open and close each opening for passage of the material therethrough, liquid delivery means associated with said hopper for washing the materials downwardly through the openings, and a row of removable sluices being arranged beneath the openings in said hopper to provide for delivery and selective separation of the material according to differences in specific gravity.

9. An ore concentrating apparatus according to claim 8, said grate being pivotally mounted at one end for vertical reciprocating movement, said screen being slidably mounted for horizontal reciprocating movement, a power source, linkage connecting said power source to said grate and said screen, and said linkage including said reciprocating means to reciprocate said grate in a vertical direction and second means to reciprocate said screen in a horizontal direction whereby to encourage initial separation of the materials according to size.

10. An ore concentrating apparatus according to claim 9, said grate being in the form of spaced parallel bars pivotally mounted at one end, and said reciprocating means including elements engaging alternate bars of said grate to provide for reciprocal movement of the alternate bars.

References Cited by the Examiner
UNITED STATES PATENTS

| | | | |
|---|---|---|---|
| 327,915 | 10/1885 | Armstrong | 209—44 |
| 620,014 | 2/1899 | Blacket | 209—44 |
| 2,091,811 | 8/1937 | Gilbreth | 209—506 XR |
| 2,709,521 | 5/1955 | Fisher | 209—504 XR |
| 2,966,262 | 12/1960 | Hobart | 209—157 XR |
| 2,989,184 | 6/1961 | Gobatti | 209—437 |
| 3,106,523 | 10/1963 | Couture | 209—396 XR |

FOREIGN PATENTS 202,942   4/1959   Austria.

HARRY B. THORNTON, *Primary Examiner.*

FRANK W. LUTTER, *Examiner.*